Nov. 16, 1954

B. H. CARROLL 2,694,638

SUPERSENSITIZATION OF CARBOCYANINE
DYES WITH HEMICYANINE BASES

Filed Aug. 13, 1953

Fig. 1

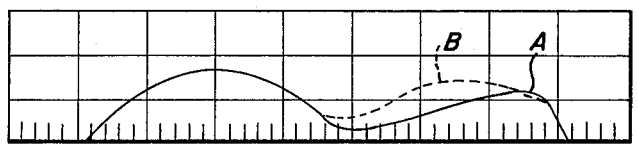

A = 3,3'-DIMETHYL-9-PHENYL-4:5,4':5'-DIBENZOTHIACARBOCYANINE BROMIDE
B = 3,3'-DIMETHYL-9-PHENYL-4:5,4':5'-DIBENZOTHIACARBOCYANINE BROMIDE
PLUS 1-ETHYL-2-(2-PHENYLIMINOPROPYLIDENE)-β-NAPHTHOTHIAZOLINE

Fig. 2

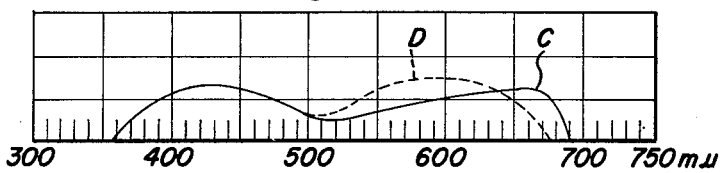

C = 3,3'-DIMETHYL-9-PHENYLSELENACARBOCYANINE BROMIDE
D = 3,3'-DIMETHYL-9-PHENYLSELENACARBOCYANINE BROMIDE PLUS 1-ETHYL
-2-(2-PHENYLIMINOPROPYLIDENE)-β-NAPHTHOTHIAZOLINE

Fig. 3

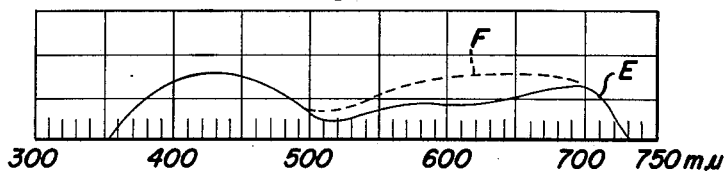

E = 9-ETHYL-1,3-DIMETHYLTHIA-2'-CARBOCYANINE IODIDE
F = 9-ETHYL-1,3-DIMETHYLTHIA-2'-CARBOCYANINE IODIDE PLUS 1-ETHYL
-2-(PHENYLIMINOPROPYLIDENE)-β-NAPHTHOTHIAZOLINE

BURT H. CARROLL
INVENTOR.

BY

ATTORNEY & AGENT

United States Patent Office 2,694,638
Patented Nov. 16, 1954

2,694,638

SUPERSENSITIZATION OF CARBOCYANINE DYES WITH HEMICYANINE BASES

Burt H. Carroll, Rochester, N. Y., assignor to Eastman Kodak Company, Rochester, N. Y., a corporation of New Jersey Application August 13, 1953, Serial No. 373,981

18 Claims. (Cl. 95—7)

This invention relates to photographic emulsions comprising certain carbocyanine dyes, and as supersensitizers therefor, certain hemicarbocyanine bases.

It is known in the art of making photographic emulsions that certain dyes of the cyanine class alter the sensitivity of photographic emulsions of the gelatino-silver kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying conditions in the emulsion. For example, the sensitization may be increased by increasing the silver ion concentration or decreasing the hydrogen ion concentration (i. e. increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

More recently, it has been found that the sensitization produced in an emulsion by certain cyanine dyes, particularly monomethine cyanine dyes, can be increased by incorporating in the sensitized emulsion certain hemicyanine dyes, particularly hemidicarbocyanine dyes (U. S. Patent 2,218,230, dated October 15, 1940). Inasmuch as conditions in the emulsion, i. e., the silver ion and/or the hydrogen ion concentration undergo little or no change in such a method, the phenomenon has been called "supersensitization."

I have now found a new means of altering the sensitivity in emulsions containing certain other cyanine dyes of a particular type. Since the conditions in the emulsion, i. e. the hydrogen ion and/or the silver ion concentration undergo little or no change in my new method, I shall designate my new method as a kind of supersensitization. In my U. S. Patent 2,533,427, issued December 12, 1950, I have shown that the sensitivity of photographic emulsions containing certain meso-aryl carbocyanine dyes could be advantageously altered by certain hemicyanine dyes. Substitution of the hemi-cyanine dyes of U. S. Patent 2,533,427 by the corresponding hemicyanine bases gives a high proportion of negative results. and hemicyanine bases have not previously been reported as supersensitizers. It was found, however, that selected hemicyanine bases can be used to supersensitize photographic emulsions containing meso-aryl carbocyanines, or certain other carbocyanines. The hemicyanine bases useful in practicing my invention are the hemicarbocyanine bases containing a β-naphthothiazoline nucleus. Hemicarbocyanine bases containing other nuclei, such as benzoxazole, thiazole, etc., have been found to be ineffective in providing the useful results of my invention.

It is, therefore, an object of my invention to provide photographic emulsions comprising certain carbocyanine dyes and, as supersensitizers therefor, certain hemicarbocyanine bases. A further object is to provide a process for preparing these supersensitized emulsions. Other objects will become apparent from a consideration of the following description and examples.

The carbocyanine dyes useful in practicing my invention comprise 2,2'-carbocyanine dyes, 9-alkylthia-2'-carbocyanine dyes, and meso-substituted carbocyanine dyes selected from those represented by the following general formula:

I 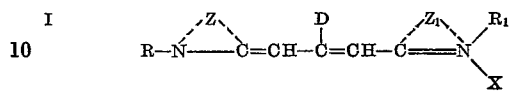

wherein R and $R_1$ each represents an alcohol radical (i. e. an alkyl group, substituted or unsubstituted), e. g. methyl, ethyl, n-propyl, n-butyl, isobutyl, etc. groups, D represents an alcohol radical (i. e. an alkyl group, substituted or unsubstituted), e. g. methyl, ethyl, n-propyl, n-butyl, isobutyl, etc. groups or an aryl group, e. g. phenyl, o- and p-chlorophenyl, o-, m-, and p-tolyl, etc. groups, Z and $Z_1$ each represents the non-metallic atoms necessary to complete a heterocyclic nucleus selected from those of the benzothiazole series, those of the β-naphthothiazole series and those of the benzoselenazole series, and X represents an anion, such as halide (e. g. bromide, iodide, chloride), methylsulfate ($CH_3SO_4^-$), ethylsulfate ($C_2H_5SO_4^-$), benzenesulfonate, p-toluenesulfonate, perchlorate, thiocyanate, etc.). The dyes represented by the above formula can advantageously be prepared by methods described in U. S. Patents 1,934,657 (dated November 7, 1933), 1,934,659 (dated November 7, 1933), 2,369,646 (dated February 20, 1945), and 2,369,657 (dated February 20, 1945).

Typical 2,2'-carbocyanines useful in practicing my invention include 1,1'-dimethyl-2,2'-carbocyanine iodide; 1,1'-diethyl-2,2'-carbocyanine iodide; 1,1'-diethyl-2,2'-carbocyanine p-toluenesulfonate; 6,6'-dichloro-1,1'-diethyl-2,2'-carbocyanine p-toluenesulfonate, etc. These dyes can be prepared by methods described in British Patent 344,409, accepted March 4, 1931, or by Konig-"Berichte," 1922, vol. 55, page 3293.

Typical 9-alkylthia-2'-carbocyanine dyes useful in practicing my invention comprise 9-ethyl-1',3-dimethylthia-2'-carbocyanine iodide, 1',3,9-trimethylthia-2'-carbocyanine iodide, etc. These dyes can be prepared by the method described in Keyes U. S. application Serial No. 620,164 (filed October 3, 1945) and abstract thereof published in vol. 647 of the Official Gazette of the United States Patent Office on June 26, 1951.

The hemicarbocyanine bases useful as supersensitizers acording to the method of my invention can advantageously be represented by the following general formula:

II 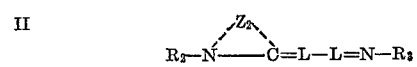

wherein $R_2$ represents an alcohol radical (i. e. an alkyl group, substituted and unsubstituted), e. g. methyl, ethyl, n-propyl, n-butyl, isobutyl, etc. groups, L represents a methenyl group, such as =CH— or substituted methenyl (e. g. a =$CR_4$— group, wherein $R_4$ is a methyl or ethyl group), $R_3$ represents an aryl group (e. g. a phenyl group, o- or p-chlorophenyl group, an alkoxyphenyl group, etc.), and $Z_2$ represents the non-metallic atoms necessary to complete a heterocyclic nucleus of the β-naphthothiazoline series. The bases represented by Formula II above can be prepared by the methods described in U. S. Patent 2,298,732 (dated October 13, 1942). See also, Brooker et al., "J. A. C. S.," vol. 63, pages 3192–3203.

The heterocyclic nuclei of the dyes selected from those represented by Formulas I and II above, and the meso-alkyl, and meso-aryl (D in Formula I) groups in the carbocyanine dyes of our invention can be substituted by simple substituents which do not interfere with sensitizing properties, e. g. alkoxyl (e. g. methoxyl, ethoxyl, etc.), chloro, alkyl (e. g. methyl, ethyl, etc.), etc. groups.

The carbocyanine dyes useful in practicing my invention represented by Formula I above are well known in the art. Especially useful are the:

(A) 9 - aryl - 3,3' - dialkyl - 4:5,4':5' - dibenzothiacarbocyanine salts, e. g.: 3,3'-dimethyl-9-phenyl-4:5,4':5'-dibenzothiacarbocyanine bromide.

(B) 9 - aryl - 3,3' - dialkylthiacarbocyanine salts, e. g.: 3,3' - diethyl - 9 - phenylthiacarbocyanine bromide.

(C) 9 - aryl - 3,3' - dialkylselenacarbocyanine salts, e. g.: 3,3' - dimethyl - 9 - phenylselenacarbocyanine bromide.

(D) 9 - aryl - 3,3' - dialkyl - 4.5 - benzothiathiacarbocyanine salts, e. g.: 3,3' - dimethyl - 9 - phenyl - 4,5 - benzothiathiacarbocyanine bromide.

(E) 9 - aryl - 3,3' - dialkyl - 4,5 - benzothiaselenacarbocyanine salts, e. g.: 3,3' - dimethyl - 9 - phenyl - 4,5-benzothaselenacarbocyanine bromide.

(F) 9 - aryl - 3,3' - dialkylthiaselenacarbocyanine salts, e. g.: 3,3' - dimethyl - 9 - phenylthiaselenacarbocyanine bromide.

(G) 3,3',9 - trialkyl - 4:5,4':5' - dibenzothiacarbocyanine salts, e. g.: 3,3' - diethyl - 9 - methyl - 4:5,4':5" - dibenzothiacarbocyanine bromide, 9 - ethyl - 3,3' - dimethyl-4:5,4':5' - dibenzothiacarbocyanine chloride.

(H) 3,3',9-trialkylthiacarbocyanine salts, e. g.: 3,3'-diethyl-9-methylthiacarbocyanine bromide.

(I) 3,3',9 - trialkyl - 4:5 - benzothiathiacarbocyanine salts, e. g.: 3,3'-diethyl-9-methyl-4:5-benzothiathiacarbocyanine bromide.

Typical hemicarbocyanine bases represented by Formula II useful in practicing my invention are those selected from the following, for example:

(A') 1-alkyl-2-(2-aryliminoethylidene) - β - naphthothiazolines, e. g.: 1-ethyl-2-(2-phenyliminoethylidene)-β-naphthothiazoline.

(B') 1-alkyl-2-(2-aryliminopropylidene) - β - naphthothiazolines, e. g.: 1-ethyl-2-(2-phenyliminopropylidene)-β-naphthothiazoline.

(C') 1-alkyl-2-(2-aryliminobutylidene) - β - naphthothiazolines, e. g.: 1-ethyl-2-(2-phenyliminobutylidene)-β-naphthothiazoline, 2-[2-(p-chlorophenylimino) butylidene]-1-methyl-β-naphthothiazoline.

According to my invention, I incorporate one or more of the carbocyanine dyes described above (i. e. 2,2'-carbocyanine, 9-alkylthia-2'-carbocyanine or meso-substituted carbocyanine dyes selected from those represented by Formula I) with one or more of the hemicarbocyanine bases selected from those represented by Formula II above in a photographic emulsion. However, my supersensitizing combinations can be employed in silver halide emulsions in which the carrier is other than gelatin, e. g. a resinous substance or cellulosic material which has substantially no deleterious effect on the light-sensitive materials.

The carbocyanine dyes and hemicarbocyanine bases can be employed in various concentrations depending upon the effects desired. As is well known in the art, the sensitivity conferred upon an emulsion by a sensitizing dye does not increase proportionately to the concentration of the dye in the emulsion, but rather passes through a maximum as the concentration is increased. In practicing my invention, the individual carbocyanine dyes and hemicarbocyanine bases are advantageously employed in a concentration somewhat less than their optimum concentration (i. e. the concentration at which the individual carbocyanine dyes and hemicarbocyanine bases give greatest sensitivity). If each of the carbocyanine dyes and hemicarbocyanine bases in the supersensitizing combination is employed in its optimum concentration, it is possible, in certain cases that the sensitization produced by the sensitizing combination will have passed through a maximum.

The optimum concentration of an individual sensitizing dye can be determined in a manner well known to those skilled in the art by measuring the sensitivity of a series of test portions of the same emulsion, each portion containing a different concentration of the sensitizing dye. The optimum concentration of my supersensitizing combinations can, of course, be readily determined in the same manner, by measuring the sensitivity of a series of test portions of the same emulsion, each portion containing different concentrations of the individual carbocyanine dyes or hemicarbocyanine bases in the combination. In determining the optimum concentration for the supersensitizing combination, it is advantageous to employ, at first, concentrations of the individual carbocyanine dyes or hemicarbocyanine bases less than their optimum concentrations. The concentrations of the individual carbocyanine dyes or hemicarbocyanine bases can then be increased until the optimum concentration of the supersensitizing combination is determined.

Ordinarily, the optimum or near-optimum concentration of the carbocyanine dyes which I employ in practicing my invention, is of the order of 0.05 to 0.25 g. per mole of silver halide in the emulsion.

The hemicarbocyanine bases utilized in my invention are advantageously employed at concentrations on the order of 0.05 to 0.25 g. per mole of silver halide in the emulsion.

Generally speaking, the ratio of concentration of a hemicarbocyanine base (Formula II) to carbocyanine dye can vary rather widely in my new combinations, e. g. from 5:1 to 1:5 (by weight) in many cases.

The methods of incorporating sensitizing dyes in emulsions are well known to those skilled in the art. In practicing my invention, the carbocyanine dyes and hemicarbocyanine bases can be incorporated in the emulsions separately or together. It is convenient to add the carbocyanine dye and hemicarbocyanine base separately in the form of solutions in appropriate solvents. Methanol and ethanol, especially the former, have proven satisfactory for the purposes of my invention. The carbocyanine dyes and hemicarbocyanine bases are advantageously incorporated in the finished washed emulsions and should be uniformly distributed throughout the emulsions. The following procedure is satisfactory: Stock solutions of the carbocyanine dyes and hemicarbocyanine bases desired are prepared by dissolving the same in methyl or ethyl alcohol. Then to one liter of a flowable gelatino-silver-halide emulsion, the desired amounts of the stock solution of one of the carbocyanine dyes or hemicarbocyanine bases (diluted somewhat with water, if desired) is slowly added, while stirring the emulsion. Stirring is continued until the carbocyanine dye or hemicarbocyanine base is thoroughly incorporated in the emulsion. Then the desired amount of the stock solution of the second carbocyanine dye or hemicarbocyanine base (diluted somewhat with water, if desired) is slowly added to the emulsion, while stirring. Stirring is continued until the second dye or base is thoroughly incorporated. The supersensitized emulsion can then be coated out on a suitable support, such as glass, cellulose derivative film, resin film, or paper, to a suitable thickness and allowed to dry. The details of such coating methods are well known to those skilled in the art.

The amounts of the individual carbocyanine dyes and hemicarbocyanine bases actually incorporated in the emulsion will vary somewhat from combination to combination, according to the emulsion employed and according to the effect desired. The regulation and adoption of the most economical and useful proportions will be apparent to those skilled in the art upon making the ordinary observations and tests consequently employed in the art. Accordingly, the foregoing procedures and proportions are to be regarded only as illustrative. Clearly my invention is directed to any emulsion containing a combination of the aforesaid carbocyanine dyes and hemicarbocyanine bases whereby a supersensitizing effect is obtained.

The following examples will serve to illustrate further the manner of practicing my invention. To different portions of the same batch of photographic gelatino-silver-bromiodide emulsion were added (1) a carbocyanine dye selected from those defined above and (2) a combination of the carbocyanine dye and a hemicarbocyanine base selected from those represented by Formula II above. Different emulsions were used in some of the examples, although the emulsions of each individual example are obtained from the same batch. The different portions of emulsion were then coated on glass supports and exposed in the usual manner in a spectrograph and a sensitometer to white light and through filters including a Wratten No. 25 filter, i. e. a filter which transmits substantially no light of wavelength shorter than 580 m$\mu$. Following are several examples of such emulsions together with the speed (clear or white light and red) gamma and fog obtained.

| Example | Dye (g. per mole of silver halide in emulsion) | White Light Exposure ||| Red Light Exposure |||
|---|---|---|---|---|---|---|---|
| | | Speed | Gamma | Fog | Speed | Gamma | Fog |
| 1 | (a) 3,3'-dimethyl-9-phenyl-4:5,4':5'-dibenzothiacarbocyanine bromide (0.058) | 33.0 | 5.30 | .08 | 13.2 | 6.0 | .08 |
| | (b) dye (a) (0.058) with 1-ethyl-2-(2-phenyliminopropylidene)-β-naphthothiazoline (0.029). | 37.0 | 4.90 | .09 | 18.0 | 5.65 | .09 |
| 2 | (c) dye (a) (0.078) | 1,380 | 1.23 | .10 | 165 | 1.25 | .10 |
| | (d) dye (a) (0.078) with 2-[2-(p-chlorophenylimino)butylidene]-1-methyl-β-naphthothiazoline (0.078). | 780 | 1.53 | .10 | 355 | 1.37 | .10 |
| 3 | (e) 3,3'-dimethyl-9-phenylthiacarbocyanine iodide (0.078) | 100 | 2.92 | .05 | 12.3 | 2.84 | .05 |
| | (f) dye (e) (0.078) with 2-[2-(p-chlorophenylimino)butylidene]-1-methyl-β-naphthothiazoline (0.078). | 112 | 2.61 | .05 | 26.5 | 2.84 | .05 |
| 4 | (g) 3,3'-dimethyl-9-phenylselenacarbocyanine bromide (0.078) | 86.0 | 3.64 | .05 | 20.0 | 3.58 | .05 |
| | (h) dye (g) (0.078) with 1-ethyl-2-(2-phenyliminopropylidene)-β-naphthothiazoline (0.078). | 190 | 2.83 | .05 | 36.0 | 3.15 | .05 |
| 5 | (i) 3,3'-diethyl-9-phenyl-4:5,4':5-dibenzothiacarbocyanine bromide (0.078) | 162 | 2.90 | .06 | 68.0 | 2.79 | .06 |
| | (j) dye (i) (0.078 with 1-ethyl-2-(2-phenyliminopropylidene)-β-naphthothiazoline (0.078). | 230 | 2.70 | .05 | 90.0 | 2.79 | .05 |
| 6 | (k) 6,6'-dichloro-1,1'-diethyl-2,2'-carbocyanine p-toluenesulfonate (0.039) | 62.0 | 3.72 | .10 | 4.40 | 3.56 | .10 |
| | (l) dye (k) (0.039) with 2-[2-(p-chlorophenylimino)butylidene]-1-methyl-β-naphthothiazoline (0.078). | 56.0 | 3.65 | .07 | 13.2 | 5.00 | .07 |
| | (m) dye (a) (0.078) | 100 | 3.6 | .10 | 12.3 | 6.15 | .10 |
| | (n) dye (a) (0.078) with 2-[2-(p-chlorophenylimino)butylidene]-1-methyl-β-naphthothiazoline (0.078). | 138 | 4.40 | .10 | 54.0 | 4.60 | .10 |
| 8 | (o) dye (a) (0.077) | 23.5 | 4.25 | .05 | 7.10 | 6.60 | .05 |
| | (p) dye (a) (0.077) with 2-[2-(p-chlorophenylimino)butylidene]-1-methyl-β-naphthothiazoline (0.077). | 69.0 | 4.90 | .08 | 48.0 | 4.65 | .08 |
| 9 | (q) 3,3'-diethyl-9-methyl-4:5,4':5'-dibenzothiacarbocyanine bromide (0.077) | 110 | 4.35 | .08 | 35.0 | 5.40 | .08 |
| | (r) dye (q) (0.077) with 1-ethyl-2-(2-phenyliminopropylidene)-β-naphthothiazoline (0.077). | 140 | 4.45 | .08 | 78.0 | 4.60 | .08 |
| 10 | (s) dye (a) (0.077) | 29.5 | 4.15 | .09 | 13.5 | 4.05 | .09 |
| | (t) dye (a) (0.077) with 2-[2-(p-chlorophenylimino)butylidene]-1-methyl-β-naphthothiazoline (0.077). | 102 | 4.25 | .08 | 73.0 | 4.80 | .08 |
| 11 | (u) 3,3'-dimethyl-9-ethyl-4:5,4':5'-dibenzothiacarbocyanine chloride (0.059) | 1,350 | 1.56 | .06 | 450 | 1.54 | .06 |
| | (v) dye (u) (0.059) with 1-ethyl-2-(2-phenyliminoethylidene)-β-naphthothiazoline (0.078). | 1,750 | 1.13 | .08 | 760 | 1.07 | .08 |
| 12 | (w) dye (q) (0.078) | 2,350 | 1.35 | .13 | 650 | 1.40 | .13 |
| | (x) dye (q) (0.078) with 1-ethyl-2-(2-phenyliminopropylidene)-β-naphthothiazoline (0.039) | 2,000 | 1.54 | .16 | 980 | 1.38 | .16 |
| 13 | (y) 3,3'-dimethyl-9-ethyl-4:5,4':5'-dibenzothiacarbocyanine chloride (0.059) | 1,350 | 1.56 | .06 | 450 | 1.54 | .06 |
| | (z) dye (y) (0.059) with 1-ethyl-2-(2-phenyliminoethylidene)-β-naphthothiazoline (0.078). | 1,750 | 1.13 | .08 | 760 | 1.07 | .08 |
| 14 | (a') 9-ethyl-1',3-dimethylthia-2'-carbocyanine iodide (0.078) | 128 | 3.38 | .05 | 35.0 | 3.52 | .05 |
| | (b') dye (a') (0.078) with 1-ethyl-2-(2-phenyliminopropylidene)-β-naphthothiazoline (0.078). | 175 | 2.87 | .06 | 65.0 | 3.18 | .06 |
| 15 | (c') dye (a') (0.078) | 315 | 1.71 | .08 | 62.0 | 1.54 | .08 |
| | (d') dye (a') (0.078) with 1-ethyl-2-(2-phenyliminopropylidene)-β-naphthothiazoline (0.078). | 255 | 1.85 | .08 | 69.0 | 1.79 | .08 |

In a manner similar to that described above, still many other supersensitizing combinations of one or more of the carbocyanine dyes as defined above with one or more of the hemicarbocyanine bases selected from those represented by Formula II above can be prepared.

The accompanying drawing illustrates the supersensitizing effect obtained with three of my new combinations in silver bromiodide emulsions. Each figure of the drawing is a diagrammatic reproduction of two spectrograms. In each figure the sensitivity of the emulsion containing only the carbocyanine dye is represented by the lower curve. The upper curve represents the sensitivity conferred on the emulsion by the combination of the carbocyanine dye and the hemicarbocyanine base. No curve showing the sensitivity conferred on the emulsion by the hemicarbocyanine base above is shown, since the sensitivity conferred by the hemicarbocyanine base in question is too weak to be significant in the comparisons shown.

In Figure 1, curve A represents the sensitivity of an ordinary gelatino-silver-bromiodide emulsion sensitized with 3,3'-dimethyl-9-phenyl-4:5,4':5'-dibenzothiacarbocyanine bromide, and curve B represents the sensitivity of the same emulsion containing 3,3'-dimethyl-9-phenyl-4:5,4':5'-dibenzothiacarbocyanine bromide and 1-ethyl-2-(2-phenyliminopropylidene)-β-naphthothiazoline. The sensitometric measurements of these emulsions are given in Example 1 of the above table.

In Figure 2, curve C represents the sensitivity of an ordinary gelatino-silver-bromiodide emulsion sensitized with 3,3'-dimethyl-9-phenylselenacarbocyanine bromide, and curve D represents the sensitivity of the same emulsion containing 3,3'-dimethyl-9-phenylselenacarbocyanine bromide and 1-ethyl-2-(2-phenyliminopropylidene)-β-naphthathiazoline. The sensitometric measurements for these emulsions are given in Example 4 of the above table.

In Figure 3, curve E represents the sensitivity of an ordinary gelatino-silver-bromiodide emulsion containing 9-ethyl-1',3-dimethylthia-2-carbocyanine iodide, and curve F represents the sensitivity of the same emulsion containing 9-ethyl-1',3-dimethylthia-2'-carbocyanine iodide and 1 - ethyl - 2 - (2 - phenylimino-propylidene) - β - naphthathiazoline. The sensitometric measurements for these emulsions are given in Example 11 of the above table.

My invention is primarily directed to the ordinarily employed gelatino-silver-halide developing-out emulsions, e. g. gelatino-silver-chloride, -chlorobromide, -chloriodide, -chlorobromiodide, -bromide and -bromiodide developing-out emulsions. While the results in the above table were obtained using gelatino-silver-bromiodide emulsions, excellent results have also been obtained using gelatino-silver-chlorobromide emulsions. Emulsions which form the latent image mostly inside the silver halide grains, such as the emulsion set forth in U. S. Patent 2,456,956, dated December 21, 1948, can also be employed in practicing my invention.

The emulsions prepared in accordance with my invention can be coated in the usual manner on any suitable support, e. g. glass, cellulose nitrate film, cellulose acetate film, polyvinyl acetal resin film, paper or metal.

What I claim as my invention and desire secured by Letters Patent of the United States is:

1. A photographic silver halide emulsion sensitized with a supersensitizing combination of (1) at least one carbocyanine dye selected from the group consisting of 2,2'-carbocyanine dyes, 9-alkylthia-2'-carbocyanine dyes wherein the alkyl group contains from 1 to 4 carbon atoms and a meso-substituted dye selected from those represented by the following general formula:

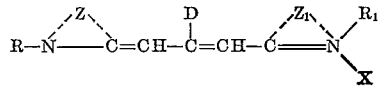

wherein R and $R_1$ each represents an alkyl group of the formula $C_nH_{2n+1}$ wherein $n$ represents a positive integer of from 1 to 4, D represents a member selected from the group consisting of an alkyl group of the formula $C_dH_{2d+1}$ wherein $d$ represents a positive integer of from 1 to 4, and a mononuclear aryl group of the benzene series, X represents an acid radical, and Z and $Z_1$ each represents the non-metallic atoms necessary to complete a heterocyclic nucleus selected from those of the benzothiazole series, those of the β-naphthothiazole series, and those of the benzoselenazole series, and (2) at least one hemicarbocyanine base selected from those represented by the following general formula:

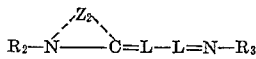

wherein $R_2$ represents an alkyl group of the formula $C_mH_{2m+1}$ wherein $m$ represents a positive integer of from 1 to 4, $R_3$ represents a mononuclear aryl group of the benzene series, L represents a methine group, and $Z_2$ represents the non-metallic atoms necessary to complete a heterocyclic nucleus of the $\beta$-naphthothiazoline series.

2. A photographic gelatino-silver-halide developing-out emulsion sensitized with a supersensitizing combination of (1) at least one carbocyanine dye selected from the group consisting of 2,2'-carbocyanine dyes, 9-alklythia-2'-carbocyanine dyes wherein the alkyl group contains from 1 to 4 carbon atoms, and a meso-substituted dye selected from those represented by the following general formula:

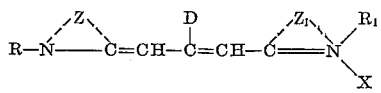

wherein R and $R_1$ each represents an alkyl group of the formula $C_nH_{2n+1}$ wherein $n$ represents a positive integer of from 1 to 4, D represents a member selected from the group consisting of an alkyl group of the formula $C_dH_{2d+1}$ wherein $d$ represents a positive integer of from 1 to 4, and a mononuclear aryl group of the benzene series, X represents an acid radical, and Z and $Z_1$ each represents the non-metallic atoms necessary to complete a heterocyclic nucleus selected from those of the benthothiazole series, those of the $\beta$-naphthothiazole series, and those of the benzoselenazole series, and (2) at least one hemicarbocyanine base selected from those represented by the following general formula:

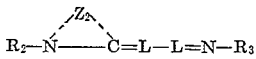

wherein $R_2$ represents an alkyl group of the formula $C_mH_{2m+1}$ wherein $m$ represents a positive integer of from 1 to 4, $R_3$ represents a mononuclear aryl group of the benzene series, L represents a methine group, and $Z_2$ represents the non-metallic atoms necessary to complete a heterocyclic nucleus of the $\beta$-naphthothiazoline series.

3. A photographic gelatino-silver-bromiodide developing-out emulsion sensitized with a supersensitizing combination of (1) at least one carbocyanine dye selected from the group consisting of 2,2'-carbocyanine dyes, 9-alkylthia-2'-carbocyanine dyes wherein the alkyl group contains from 1 to 4 carbon atoms, and a mesosubstituted dye selected from those represented by the following general formula:

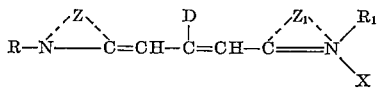

wherein R and $R_1$ each represents an alkyl group of the formula $C_nH_{2n+1}$ wherein $n$ represents a positive integer of from 1 to 4, D represents a member selected from the group consisting of an alkyl group of the formula $C_dH_{2d+1}$ wherein $d$ represents a positive integer of from 1 to 4, and a mononuclear aryl group of the benzene series, X represents an acid radical, and Z and $Z_1$ each represents the non-metallic atoms necessary to complete a heterocyclic nucleus selected from those of the benzothiazole series, those of the $\beta$-naphthothiazole series, and those of the benzoselenazole series, and (2) at least one hemicarbocyanine base selected from those represented by the following general formula:

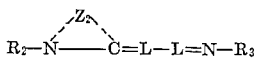

wherein $R_2$ represents an alkyl group of the formula $C_mH_{2m+1}$ wherein $m$ represents a positive integer of from 1 to 4, $R_3$ represents a mononuclear aryl group of the benzene series, L represents a methine group, and $Z_2$ represents the non-metallic atoms necessary to complete a heterocyclic nucleus of the $\beta$-naphthothiazoline series.

4. A photographic gelatino-silver-halide developing-out emulsion sensitized with a supersensitizing combination of (1) at least one carbocyanine dye selected from the group consisting of 2,2'-carbocyanine dyes, 9-alkyl-thia-2'-carbocyanine dyes wherein the alkyl group contains from 1 to 2 carbon atoms, and a meso-substituted dye selected from those represented by the following general formula:

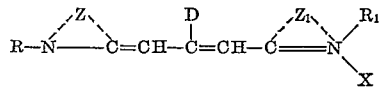

wherein R and $R_1$ each represents an alkyl group of the formula $C_nH_{2n+1}$ wherein $n$ represents a positive integer of from 1 to 2, D represents a member selected from the group consisting of an alkyl group of the formula $C_dH_{2d+1}$ wherein $d$ represents a positive integer of from 1 to 2, and a mononuclear aryl group of the benzene series, X represents an acid radical, and Z and $Z_1$ each represents the non-metallic atoms necessary to complete a heterocyclic nucleus selected from those of the benzothiazole series, those of the $\beta$-naphthothiazole series, and those of the benzoselenazole series, and (2) at least one hemicarbocyanine base selected from those represented by the following general formula:

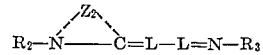

wherein $R_2$ represents an alkyl group of the formula $C_mH_{2m+1}$ wherein $m$ represents a positive integer of from 1 to 2, $R_3$ represents a mononuclear aryl group of the benzene series, L represents a methine group, and $Z_2$ represents the non-metallic atoms necessary to complete a heterocyclic nucleus of the $\beta$-naphthothiazoline series.

5. A photographic silver halide emulsion sensitized with a supersensitizing combination of (1) at least one carbocyanine dye selected from those represented by the following general formula:

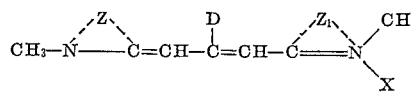

wherein X represents a halogen atom having an atomic weight of from 35 to 127, D represents a member selected from the group consisting of an alkyl group of the formula $C_dH_{2d+1}$ wherein $d$ represents a positive integer of from 1 to 2, and Z and $Z_1$ each represents the non-metallic atoms necessary to complete a heterocyclic nucleus selected from those of the benzothiazole series, those of the $\beta$-naphthothiazole series, and those of the benzoselenazole series, and (2) at least one hemicarbocyanine base selected from those represented by the following general formula:

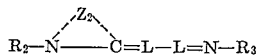

wherein $R_2$ represents an alkyl group of the formula $C_mH_{2m+1}$ wherein $m$ represents a positive integer of from 1 to 2, $R_3$ represents a mononuclear aryl group of the benzene series, L represents a methine group, and $Z_2$ represents the non-metallic atoms necessary to complete a heterocyclic nucleus of the $\beta$-naphthothiazoline series.

6. A photographic gelatino-silver-halide developing-out emulsion sensitized with a supersensitizing combination of (1) at least one carbocyanine dye selected from those represented by the following general formula:

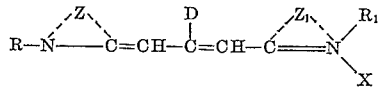

wherein R and $R_1$ each represents an alkyl group of the formula $C_nH_{2n+1}$, wherein $n$ represents a positive integer of from 1 to 2, D represents a member selected from the group consisting of an alkyl group of the formula $C_dH_{2d+1}$ wherein $d$ represents a positive integer of from 1 to 2 and a mononuclear aryl group of the benzene series, X represnts an acid radical, and Z and $Z_1$ each represents the non-metallic atoms necessary to complete a heterocyclic nucleus of the benzothiazole series, and (2) at least one hemicarbocyanine base selected from those represented by the following general formula:

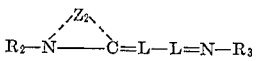

wherein $R_2$ represents an alkyl group of the formula $C_mH_{2m+1}$ wherein $m$ represents a positive integer of from 1 to 2, $R_3$ represents a mononuclear aryl group of the benzene series, L represents a methine group, and $Z_2$ represents the non-metallic atoms necessary to complete a heterocyclic nucleus of the β-naphthothiazoline series.

7. A photographic gelatino-silver-halide developing-out emulsion sensitized with a supersensitizing combination of (1) at least one carbocyanine dye selected from those represented by the following general formula:

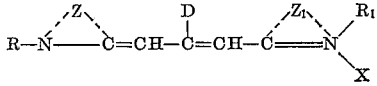

wherein R and $R_1$ each represents an alkyl group of the formula $C_nH_{2n+1}$ wherein $n$ represents a positive integer of from 1 to 2, D represents a member selected from the group consisting of an alkyl group of the formula $C_dH_{2d+1}$ wherein $d$ represents a positive integer of from 1 to 2 and a mononuclear aryl group of the benzene series, X represents an acid radical, and Z and $Z_1$ each represents the non-metallic atoms necessary to complete a heterocyclic nucleus of the β-naphthothiazole series, and (2) at least one hemicarbocyanine base selected from those represented by the following general formula:

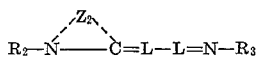

wherein $R_2$ represents an alkyl group of the formula $C_mH_{2m+1}$ wherein $m$ represents a positive integer of from 1 to 2, $R_3$ represents a mononuclear aryl group of the benzene series, L represents a methine group, and $Z_2$ represents the non-metallic atoms necessary to complete a heterocyclic nucleus of the β-naphthothiazoline series.

8. A photographic gelatino-silver-halide developing-out emulsion sensitized with a supersensitizing combination of (1) at least one carbocyanine dye selected from those represented by the following general formula:

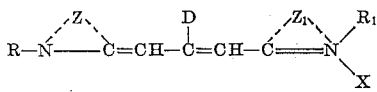

wherein R and $R_1$ each represents an alkyl group of the formula $C_nH_{2n+1}$ wherein $n$ represents a positive integer of from 1 to 2, D represents a member selected from the group consisting of an alkyl group of the formula $C_dH_{2d+1}$ wherein $d$ represents a positive integer of from 1 to 2 and a mononuclear aryl group of the benzene series, X represents an acid radical, and Z and $Z_1$ each represents the non-metallic atoms necessary to complete a heterocyclic nucleus of the benzoselenazole series, and (2) at least one hemicarbocyanine base selected from those represented by the following:

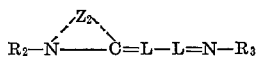

wherein $R_2$ represents an alkyl group of the formula $C_mH_{2m+1}$ wherein $m$ represents a positive integer of from 1 to 2, $R_3$ represents a mononuclear aryl group of the benzene series, L represents a methine group, and $Z_2$ represents the non-metallic atoms necessary to complete a heterocyclic nucleus of the β-naphthothiazoline series.

9. A photographic gelatino-silver-halide developing-out emulsion sensitized with a supersensitizing combination of (1) at least one carbocyanine dye selected from those represented by the following general formula:

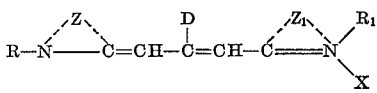

wherein R and $R_1$ each represents an alkyl group of the formula $C_nH_{2n+1}$ wherein $n$ represents a positive integer of from 1 to 2, D represents a mononuclear aryl group of the benzene series, X represents an acid radical, and Z and $Z_1$ each represents the non-metallic atoms necessary to complete a heterocyclic nucleus selected from the group consisting of those of the benzothiazole series, those of the β-naphthothiazole series, and those of the benzoselenazole series, with (2) at least one hemicarbo-cyanine base selected from those represented by the following general formula:

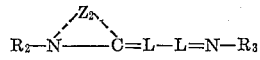

wherein $R_2$ represents an alkyl group of the formula $C_mH_{2m+1}$ wherein $m$ represents a positive integer of from 1 to 2, $R_3$ represents a mononuclear aryl group of the benzene series, L represents a methine group, and $Z_2$ represents the non-metallic atoms necessary to complete a heterocyclic nucleus of the β-naphthothiazoline series.

10. A photographic gelatino-silver-halide developing-out emulsion sensitized with a supersensitizing combination of (1) at least one carbocyanine dye selected from the group consisting of 2,2′-carbocyanine dyes, 9-alkylthia-2′-carbocyanine dyes wherein the alkyl group contains from 1 to 2 carbon atoms, and a meso-substituted dye selected from those represented by the following general formula:

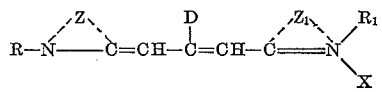

wherein R and $R_1$ each represents an alkyl group of the formula $C_nH_{2n+1}$ wherein $n$ represents a positive integer of from 1 to 2, D represents a member selected from the group consisting of an alkyl group of the formula $C_dH_{2d+1}$ wherein $d$ represents a positive integer of from 1 to 2, and a mononuclear aryl group of the benzene series, X represents an acid radical, and Z and $Z_1$ each represents the non-metallic atoms necessary to complete a heterocyclic nucleus selected from the group consisting of those of the benzothiazole series, those of the β-naphthothiazole series, and those of the benzoselenazole series, and (2) at least one hemicarbocyanine base selected from those represented by the following general formula:

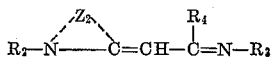

wherein $R_2$ represents an alkyl group of the formula $C_mH_{2m+1}$ wherein $m$ represents a positive integer of from 1 to 2, $R_3$ represents a mononuclear aryl group of the benzene series, $R_4$ represents a member selected from the group consisting of a hydrogen atom, a methyl group, and an ethyl group, and $Z_2$ represents the non-metallic atoms necessary to complete a heterocyclic nucleus of the β-naphthothiazoline series.

11. A photographic gelatino-silver-halide developing-out emulsion sensitized with a supersensitizing combination of (1) at least one carbocyanine dye selected from those represented by the following general formula:

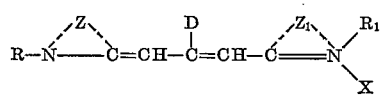

wherein R and $R_1$ each represents an alkyl group of the formula $C_nH_{2n+1}$ wherein $n$ represents a positive integer of from 1 to 2, D represents a member selected from the group consisting of an alkyl group of the formula $C_dH_{2d+1}$ wherein $d$ represents a positive integer of from 1 to 2, and a mononuclear aryl group of the benzene series, X represents an acid radical, and Z and $Z_1$ each represents the non-metallic atoms necessary to complete a heterocyclic nucleus of the benzothiazole series, and (2) at least one hemicarbocyanine base selected from those represented by the following general formula:

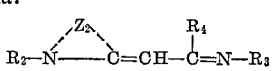

wherein $R_2$ represents an alkyl group of the formula $C_mH_{2m+1}$ wherein $m$ represents a positive integer of from 1 to 2, $R_3$ represents a mononuclear aryl group of the benzene series, $R_4$ represents a member selected from the group consisting of a hydrogen atom, a methyl group, and an ethyl group, and $Z_2$ represents the non-metallic atoms necessary to complete a heterocyclic nucleus of the β-naphthothiazoline series.

12. A photographic gelatino-silver-halide developing-out emulsion sensitized with a supersensitizing combination of (1) at least one carbocyanine dye selected from those represented by the following general formula:

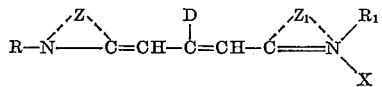

wherein R and R₁ each represents an alkyl group of the formula $C_nH_{2n+1}$ wherein $n$ represents a positive integer of from 1 to 2, D represents a member selected from the group consisting of an alkyl group of the formula $C_dH_{2d+1}$ wherein $d$ represents a positive integer of from 1 to 2, and a mononuclear aryl group of the benzene series, X represents an acid radical, and Z and X₁ each represents the non-metallic atoms necessary to complete a heterocyclic nucleus of the β-naphthothiazole series, and (2) at least one hemicarbocyanine base selected from those represented by the following general formula:

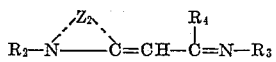

wherein R₂ represents an alkyl group of the formula $C_mH_{2m+1}$ wherein $m$ represents a positive integer of from 1 to 2, R₃ represents a mononuclear aryl group of the benzene series, R₄ represents a member selected from the group consisting of a hydrogen atom, a methyl group, and an ethyl group, and Z₂ represents the non-metallic atoms necessary to complete a heterocyclic nucleus of the β-naphthothiazoline series.

13. A photographic gelatino-silver-halide developing-out emulsion sensitized with a supersensitizing combination of (1) at least one carbocyanine dye selected from those represented by the following general formula:

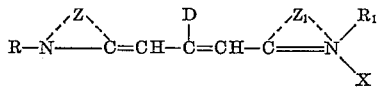

wherein R and R₁ each represents an alkyl group of the formula $C_nH_{2n+1}$ wherein $n$ represents a positive integer of from 1 to 2, D represents a member selected from the group consisting of an alkyl group of the formula $C_dH_{2d+1}$ wherein $d$ represents a positive integer of from 1 to 2, and a mononuclear aryl group of the benzene series, X represents an acid radical, and Z and Z₁ each represents the non-metallic atoms necessary to complete a heterocyclic nucleus of the benzoselenazole series, and (2) at least one hemicarbocyanine base selected from those represented by the following general formula:

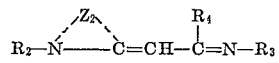

wherein R₂ represents an alkyl group of the formula $C_mH_{2m+1}$ wherein $m$ represents a positive integer of from 1 to 2, R₃ represents a mononuclear aryl group of the benzene series, R₄ represents a member selected from the group consisting of a hydrogen atom, a methyl group, and an ethyl group, and Z₂ represents the non-metallic atoms necessary to complete a heterocyclic nucleus of the β-naphthothiazoline series.

14. A photographic gelatino-silver-halide developing-out emulsion sensitized wtih a supersensitizing combination of 3,3'-dimethyl-9-phenylthiacarbocyanine iodide and 2-[2 - (p - chlorophenylimino)butylidene] - 1 - methyl-β-naphthothiazoline.

15. A photographic gelatino-silver-halide developing-out emulsion sensitized with a supersensitizing combination of 3,3'-dimethyl-9-phenyl-4:5,4':5'-dibenzothiacarbocyanine bromide and 1-ethyl-2-(2-phenyliminopropylidene)-β-naphthothiazoline.

16. A photographic gelatino-silver-halide developing-out emulsion sensitized with a supersensitizing combination of 3,3'-dimethyl-9-phenyl-4:5,4':5'-dibenzothiacarbocyanine bromide and 2-[2-(p-chlorophenyl)butylidene]-1-methyl-β-naphthothiazoline.

17. A photographic gelatino-silver-halide developing-out emulsion sensitized with a supersensitizing combination of 3,3'-dimethyl-9-phenylselenacarbocyanine bromide and 1-ethyl-2-(2-phenyliminopropylidene)-β-naphthothiazoline.

18. A photographic gelatino-silver-halide developing-out emulsion sensitized with a supersensitizing combination of 3,3'-dimethyl-9-ethyl-4:5,4':5'-dibenzothiacarbocyanine chloride and 1-ethyl-2-(2-phenyliminoethylidene)-β-naphthothiazoline.

No references cited.